United States Patent [19]

Mann

[11] 4,023,533
[45] May 17, 1977

[54] PROTECTED FEEDER AND/OR INSECTICIDE APPLICATOR FOR LIVESTOCK

[76] Inventor: Fred W. Mann, P.O. Box 444, Waterville, Kans. 66548

[22] Filed: Dec. 15, 1975

[21] Appl. No.: 641,693

[52] U.S. Cl. .............................................. 119/159
[51] Int. Cl.² ...................................... A01K 29/00
[58] Field of Search ........ 119/159, 156, 157, 52 R, 119/53, 61, 51 R

[56] References Cited

UNITED STATES PATENTS

| | | | |
|---|---|---|---|
| 2,890,681 | 6/1959 | Sack | 119/52 R |
| 2,969,769 | 1/1961 | Paschall | 119/53 |
| 3,187,722 | 6/1965 | Gilmore et al. | 119/157 |
| 3,821,940 | 7/1974 | Mann | 119/159 |
| 3,941,096 | 3/1976 | Mann | 119/159 |

*Primary Examiner*—Louis G. Mancene
*Assistant Examiner*—Peter K. Skiff
*Attorney, Agent, or Firm*—Fishburn, Gold & Litman

[57] ABSTRACT

A protected feeder and/or insecticide applicator for serving livestock as by providing a feed support protected from weather and/or an apparatus for applying insecticide material to at least the face, head, and neck area of livestock, includes a receptacle supported at a selected position above a ground surface and adapted to support a livestock attracting material or feed therein, such as salt or a mineral. The receptacle maybe surrounded by an insecticide material dispensing device. The receptacle has a plurality of access apertures each positioned above a bottom portion of the insecticide dispensing device whereby livestock must activate the insecticide dispensing device to reach and have access to the livestock attracting material in the receptacle.

9 Claims, 4 Drawing Figures

PROTECTED FEEDER AND/OR INSECTICIDE APPLICATOR FOR LIVESTOCK

The present invention relates to protected feeders and/or insecticide applicators for livestock and more particularly to such an insecticide applicator and/or feeder having a receptacle supported at a selected position above a ground surface and adapted to support livestock attracting material therein and surrounded by a protective curtain and/or a weather protected insecticide material dispensing device positioned to be engaged by livestock reaching for the livestock attracting material in the receptacle.

The principal objects of the present invention are: to provide a protected feeder and/or insecticide applicator for livestock which is easy to load or fill with insecticide material and livestock attracting material in respective portions thereof; to provide such an insecticide applicator and feeder having a receptacle with a plurality of circumferentially spaced access apertures and adapted to receive and retain therein livestock attracting material in either block or bulk form; to provide such an insecticide applicator and feeder wherein the insecticide applicator or device has means to control air flow into and out of the applicator device and thereby control amount of insecticide material dispensed therefrom; to provide such an insecticide applicator and feeder including an insert positioned within the receptacle for the livestock attracting material to define a plurality of compartments therein and which is adapted to direct flow of the livestock attracting material from above the insert into the compartments within the receptacle; and to provide such an insecticide applicator which is economical to manufacture, sturdy in use, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the combination insecticide applicator and feeder.

Figure 1:
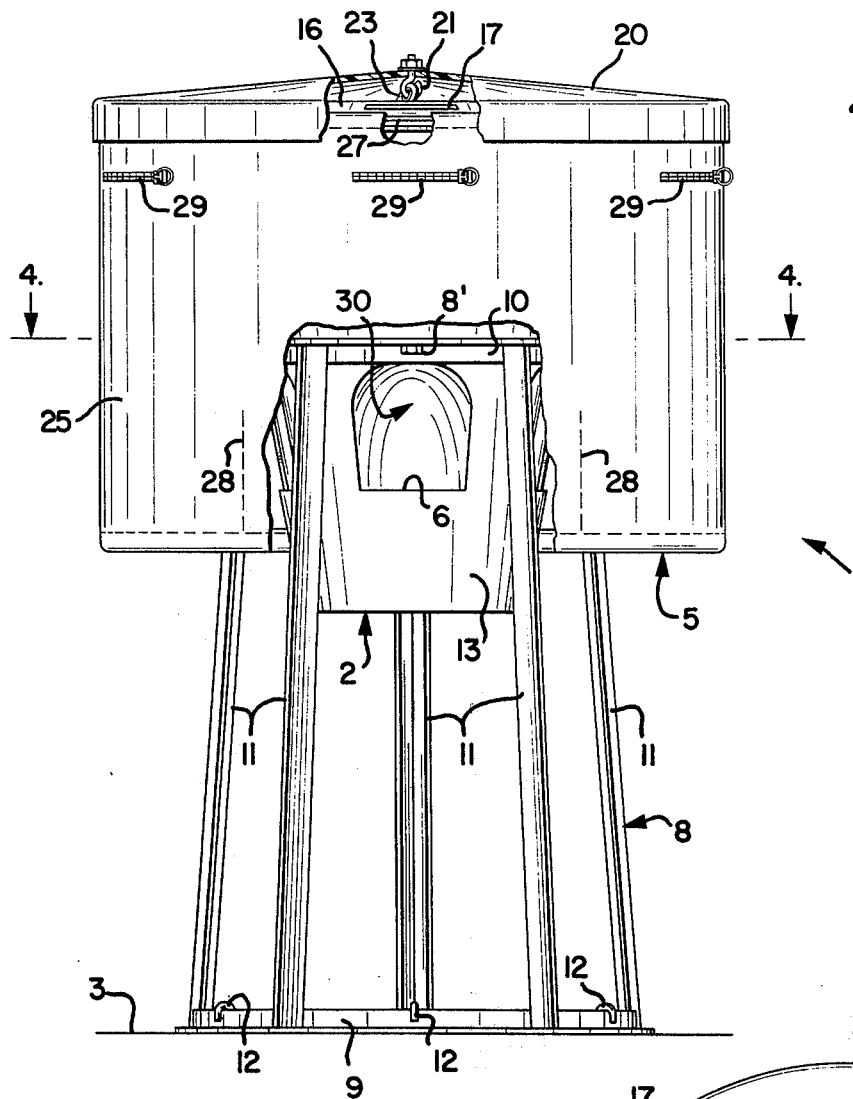
FIG. 1 is a side elevational view of the combination insecticide applicator and feeder embodying features of the present invention and shown with portions broken away to better illustrate component parts thereof.
Figure 2:
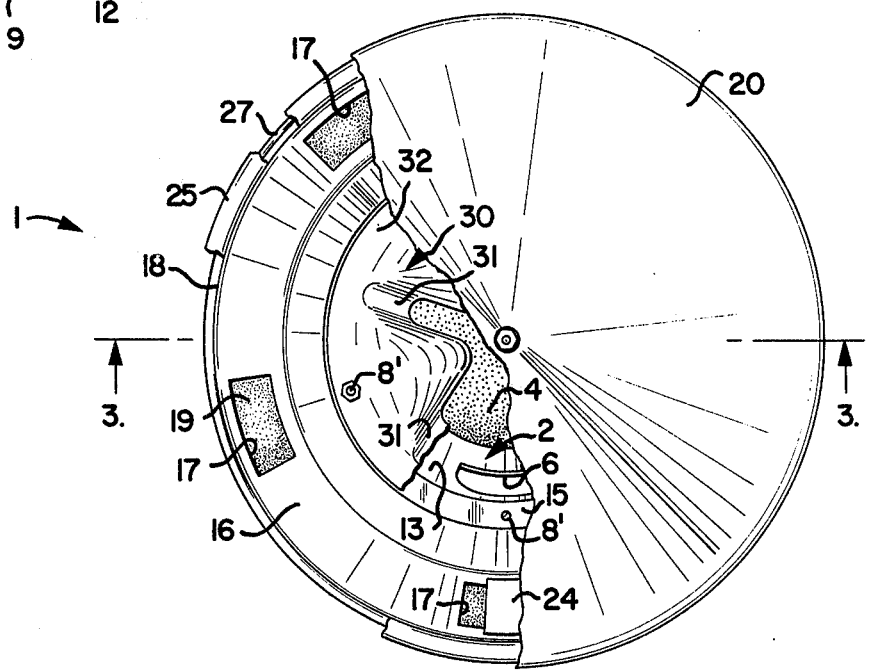
FIG. 2 is a top plan view of the combination insecticide applicator and feeder with portions broken away to better illustrate component parts thereof.
Figure 3:
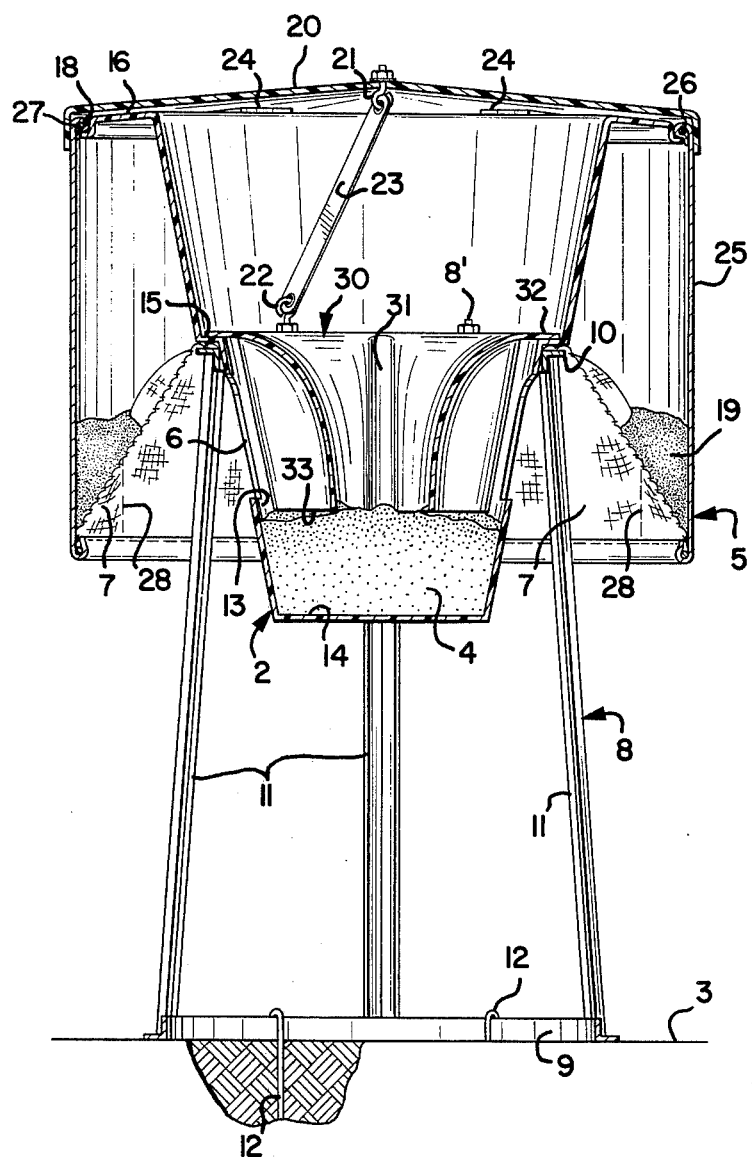
FIG. 3 is a longitudinal sectional view taken on line 3—3 of FIG. 2 and showing an insert within the receptacle for dividing same into compartments.
Figure 4:
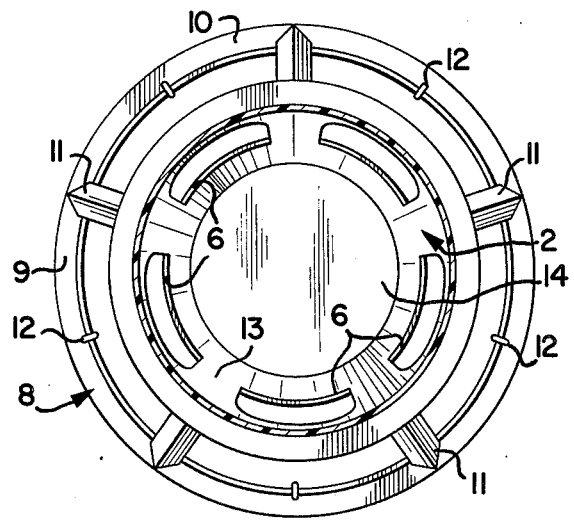
FIG. 4 is a fragmentary transverse sectional view taken on line 4—4 of FIG. 1 with the receptacle insert removed and showing the spacing of the receptacle access apertures.

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a protected feeder and/or insecticide applicator for applying insecticide material to at least the face, head, and neck area of livestock. The insecticide applicator and feeder 1 includes a receptacle 2 supported at a selected position above a ground surface 3 and adapted to support a livestock attracting material or feed 4 therein, such as salt or a mineral and may be surrounded by a shield or an insecticide material dispensing device 5. The receptacle 2 has a plurality of access apertures 6 each positioned above a bottom portion 7 of the shield or insecticide dispensing device 5 whereby livestock must lift the shield or activate the insecticide dispensing device 5 to reach and have access to the livestock attracting material 4 in the receptacle 2.

The insecticide applicator and/or feeder 1 includes a support structure 8 adapted to be suitably secured in place on the ground surface 3, such as in a pasture, feed area, or the like. The support structure 8 is adapted to support thereon the receptacle 2 and the insecticide dispensing device 5 at a selected position above the ground surface 3.

In the illustrated embodiment, the support structure 8 includes a base portion 9 and an annular upper portion 10 with upstanding members 11 extending therebetween. The base portion 9 is an annular member engaging the ground surface 3 and retained in a selected position by suitable anchors 12 driven into the ground surface 3 and engaging the base portion 9.

The upstanding members 11 are any suitable structural members, such as angles, channels, pipe, or the like, adapted to support and position the upper portion 10 of the support structure 8 at a selected spacing above the ground surface 3. The upper portion 10 is formed of any suitable structural shape adapted to support the receptacle thereon, such as an angle having one leg thereof substantially horizontal.

The receptacle 2 is an open-top structure having a side wall 13 and a bottom wall 14. The receptacle 2 is adapted to support the livestock attracting material 4 therein and has a plurality of the access openings or apertures 6 circumferentially spaced around the side wall 13. The receptacle has support portions for engaging the upper portion 10 of the base structure and in the illustrated structure, the support portions are formed by a ledge portion 15 in the side wall 13 and is positioned intermediate an upper rim portion 16 of the receptacle 2 and the bottom wall 14 of the receptacle 2. The support or ledge portion 15 is adapted to seat on the annular upper portion 10 of the support structure 8. The access apertures 6 in the side wall 13 are positioned at a selected spacing below the upper portion 10 of the support structure 8 and above the bottom wall 14 to permit the animals access to feed and the like, but with a height between the bottom wall and openings 6 to prevent the feed from being pushed or moved out of the receptacle.

The rim portion 16 is illustrated as a flange extending outwardly from an upper edge of the side wall 13 of the receptacle 2. The receptacle rim portion 16 has a plurality of circumferentially spaced ports 17 therein which when uncovered are adapted to permit introduction of desired quantities of insecticide material into the insecticide dispensing device 5. The rim portion 16 has an outwardly facing shoulder 18 adjacent the peripheral edge thereof, for a purpose later described.

The receptacle 2 is retained in position on the support structure 8 in any suitable manner, as by a plurality of circumferentially spaced fastening members, such as bolts 8′, extending through the ledge portion 15 of the receptacle 2 and through the upper portion 10 of the support structure 8. The receptacle 2 is preferably formed of a suitable tough, impact resistant and weather resistant material, such as high density polyethelene, polyproplene and like plastic.

The dispensing device 5 is positioned below the rim portion 16 of the receptacle 2 and it is desirable to provide weather protection for insecticide material 19 within the insecticide dispensing device 5 and to provide weather protection for the livestock attracting material 4 in the receptacle 2. Therefore, a cover member 20 is adapted to be retained in covering relation with the open top of the receptacle 2 and with the insecticide dispensing device 5 for covering and protecting same from weather.

In the illustrated embodiment, a center portion of the cover member 20 has a suitable fastener, such as an eye, loop or hook portion 21 depending therefrom and one or more fasteners with an eye, loop or hook 22 are mounted on the ledge portion 15 of the receptacle 2 and the upper portion 10 of the support structure 8. A resilient member or members 23 each have respective opposite ends thereof adapted to be retained in engagement with the portion 21 on the cover member 20 and a respective fastener 22.

The cover member 20 has seal means thereon for covering, or at least partially covering, each of the ports 17 in the rim portion 16 of the receptacle 2. When the seal means on the cover member 20 is positioned in covering relation with each of the ports 17, the insecticide dispensing device 5 is substantially dust-tight. When the seal means on the cover member 20 is partially covering each of the ports 17, the insecticide dispensing device 5 breathes and is thereby adapted to dispense less insecticide material each time the insecticide dispensing device is actuated by livestock reaching for the livestock attracting material 4. In the illustrated embodiment, the seal means includes foam or sponge rubber pads 24 each mounted on a lower side of the cover member 20 and shaped and each sized to engage the rim portion 16 surrounding each of the respective ports 17.

A shield 25 depends from the receptacle 2 and is positioned to protect the insecticide dispensing device 5 from weather. In the illustrated embodiment, the shield 25 is formed of flexible material, such as heavy canvas, plastic, cloth, or the like. The shield 25 is also preferably formed of a non-porous material. When the shield 25 is mounted on the receptacle 2, the shield 25 defines a cylinder. The shield 25 has a passage 26 formed adjacent the upper edge portion thereof and adapted to receive therein a drawstring 27 which, when pulled tight and tied, holds the upper edge of the shield 25 in engagement with the shoulder 18 on the rim portion 16 of the receptacle 2.

The insecticide dispensing device 5 has the insecticide material 19 therein and is supported on the receptacle 2 and surrounds same and is spaced from the access apertures 6 in the receptacle side wall 13. The insecticide dispensing device 5 is adapted to dispense the insecticide material 19 in response to engagement thereof by livestock. The illustrated insecticide dispensing device 5 is defined by the upper portion of the receptacle side wall 13, the rim portion 16, the shield 25, and the bottom portion 7 which extends between the lower edge of the shield 25 and the ledge portion 15 of the receptacle side wall 13. The bottom portion 7 is held in place between the ledge portion 15 and the upper portion 10 of the support structure 8 by the bolts 8′.

The bottom portion 7 of the insecticide dispensing device 5 is a flexible porous member adapted to permit passage of the insecticide material therethrough in response to engagement thereof by livestock. Burlap or like material has been found suitable for the bottom wall member or portion 7.

The combination insecticide applicator and feeder 1 includes means associated with the shield 25 and the bottom wall member or portion 7 of the insecticide dispensing device 5 to define a plurality of circumferentially spaced pockets or compartments each having the insecticide material 19 therein. In the illustrated embodiment, a lower edge portion of the bottom wall member 7 is secured to a lower edge portion of the shield 25 by a plurality of circumferentially spaced generally vertical seams 28 thereby defining the pockets therebetween. The pockets are adapted to retain the insecticide material 19 therein and thereby prevent shifting of the material 19 from one side to another of the insecticide dispensing device 5.

The combination insecticide applicator and feeder 1 includes means associated with the insecticide dispensing device 5 to control breathing of air into and out of the dispensing device 5 and thereby control amount of the insecticide material 19 dispensed through the bottom wall or portion 7. In the illustrated embodiment, a plurality of zippers 29 are mounted in the shield 25 adjacent an upper edge thereof. When it is desired to dispense less insecticide material 19 the zippers 29 are partially or fully opened or unzipped to allow greater air flow.

Turning of the cover member 20 relative to the ports 17 so as to position the seal pads 24 in positions circumferentially spaced from the ports 17 also allows greater air flow and thereby dispensing of less of the insecticide material 19 by permitting exhausting air from the dispensing device 5 when engaged by the livestock.

The combination insecticide applicator and feeder 1 includes an insert 30 positioned within the receptacle 2 and adapted to retain the livestock attracting material 4 thereabove and to define a plurality of compartments above the bottom wall 14 of the receptacle 2. The insert 30 is adapted to direct flow of the livestock attracting material 4 from above the insert 30 and into the plurality of compartments above the receptacle bottom wall 14. The compartments are each accessible through one of the access openings 6 in the lower portion of the receptacle side wall 13.

The insert 30 has portions defining a plurality of circumferentially spaced passages 31 communicating the upper portion of the receptacle 2 above the ledge portion 15 with the compartments in the lower portion of the receptacle 2. The insert 30 has an upper rim portion 32 engageable with the ledge portion 15 of the receptacle 2 and secured thereto by the bolts 8′. The insert 30 has a lower edge 33 thereof positioned between the access aperture 6 and the bottom wall 14 of the receptacle 2.

It is to be understood that while I have illustrated and described one form of my invention, it is not to be limited to the specific form or arrangement of parts herein described and shown.

What I claim and desire to secure by Letters Patent is:

1. A combination insecticide applicator and feeder for livestock comprising:
   a. a support structure;
   b. an open top receptacle having a side wall and a bottom wall, said receptacle being adapted to support a livestock attracting material therein and having a plurality of circumferentially spaced access apertures in said side wall;
   c. means on said support structure and on said receptacle to support said receptacle with said access apertures in a selected position above a ground surface;
   d. dispensing means having insecticide material therein and supported on said receptacle and surrounding same and spaced from said access apertures in said side wall of said receptacle for dispensing the insecticide material onto livestock in response to engagement thereof by the livestock;
   e. a shield depending from said receptacle and positioned to protect said dispensing means from weather;
   f. dispensing means providing openings in an upper portion of said dispensing means for introducing insecticide material to said dispensing means;
   g. a cover member removably mounted over said shield in covering relation with the open top of said receptacle and said dispensing means for covering and protecting same from weather; and
   h. resilient means operatively connected to said cover member to retain same in position covering the receptacle and dispensing means.

2. A combination insecticide applicator and feeder for livestock as set forth in claim 1 wherein:
   a. said receptacle has an upper rim portion extending outwardly from said side wall thereof and adapted to support said cover member thereon;
   b. said support structure has a base portion and an annular upper portion;
   c. said side wall of said receptacle has support portions positioned intermediate said upper rim portion and said bottom wall;
   d. said support portions of said receptacle side wall is adapted to seat on said annular upper portion of said support structure; and
   e. said dispensing means includes the portion of the side wall of the receptacle above said support portions and a wall extending downwardly from said support portions and having porous flexible portions therein for dispensing of insecticide material therethrough.

3. A combination insecticide applicator and feeder for livestock as set forth in claim 2 wherein:
   a. said access apertures in said side wall of said receptacle are each positioned between said support portions and said bottom wall of said receptacle and spaced upwardly from said bottom wall;
   b. said shield has a lower edge positioned below said access apertures in said side wall of said receptacle until engaged by livestock;
   c. said porous and flexible portions of the wall member of the dispensing means extends between the lower edge of said shield and said support portions of said receptacle side wall; and
   d. said flexible portions of the wall member of said dispensing means is adapted to permit passage of the insecticide material therethrough in response to engagement thereof by livestock.

4. A combination insecticide applicator and feeder for livestock as set forth in claim 3 wherein said shield forms an outer wall member of said dispensing means and said shield and said porous and flexible wall member is a bottom wall of said dispensing means and means connected to said bottom wall member and shield define a plurality of circumferentially spaced pockets each having the insecticide material therein.

5. A combination insecticide applicator and feeder for livestock comprising:
   a. a support structure;
   b. an open top receptacle having a side wall and a bottom wall, said receptacle being adapted to support a livestock attracting material therein and having a plurality of circumferentially spaced access apertures in said side wall;
   c. means on said support structure and on said receptacle to support said receptacle with said access apertures in a selected position above a ground surface;
   d. dispensing means having insecticide material therein and supported on said receptacle and surrounding same and spaced from said access apertures in said side wall of said receptacle for dispensing the insecticide material onto livestock in response to engagement thereof by the livestock;
   e. a shield depending from said receptacle and positioned to protect said dispensing means from weather;
   f. a cover member adapted to be retained in covering relation with the open top of said receptacle and said dispensing means for covering and protecting same from weather;
   g. said receptacle has an upper rim portion extending outwardly from said side wall thereof and adapted to support said cover member thereon;
   h. said side wall of said receptacle has support portions positioned intermediate said upper rim portion and said bottom wall;
   i. said support portions of said receptacle side wall are secured to said support structure;
   j. said access apertures in said side wall of said receptacle are each positioned between said support portions and said bottom wall of said receptacle and spaced upwardly from said bottom wall;
   k. said shield has a lower edge positioned below said access apertures in said side wall of said receptacle until engaged by livestock;
   l. said dispensing means has a porous and flexible bottom wall member extending between the lower edge of said shield and said support portions of said receptacle side wall;
   m. said flexible bottom wall member of said dispensing means is adapted to permit passage of the insecticide material therethrough in response to engagement thereof by livestock; and
   n. means associated with said dispensing means to control air flow through said bottom wall member of said dispensing means and thereby control amount of insecticide material dispensed through said bottom wall member.

6. A combination insecticide applicator and feeder for livestock as set forth in claim 5 wherein:
   a. said receptacle has an upper rim portion extending outwardly from said side wall thereof and adapted to support said cover member thereon;
   b. said rim portion of said receptacle has a plurality of circumferentially spaced ports therein each adapted to permit introduction of quantities of the insecticide material into said dispensing means; and
   c. said means to control air flow through said bottom wall member of said dispensing means includes means for selectively opening each of said ports in said rim portion of said receptacle.

7. A combination insecticide applicator and feeder for livestock comprising:
   a. a support structure;
   b. an open top receptacle having a side wall and a bottom wall, said receptacle being adapted to support a livestock attracting material therein and having a plurality of circumferentially spaced access apertures in said side wall;
   c. means on said support structure and on said receptacle to support said receptacle with said access apertures in a selected position above a ground surface;
   d. dispensing means having insecticide material therein and supported on said receptacle and surrounding same and spaced from said access apertures in said side wall of said receptacle for dispensing the insecticide material onto livestock in response to engagement thereof by the livestock;
   e. a shield depending from said receptacle and positioned to protect said dispensing means from weather;
   f. a cover member adapted to be retained in covering relation with the open top of said receptacle and said dispensing means for covering and protecting same from weather;
   g. said receptacle has an upper rim portion extending outwardly from said side wall thereof and adapted to support said cover member thereon;
   h. said rim portion of said receptacle has a plurality of circumferentially spaced ports therein which when uncovered are adapted to permit introduction of quantities of the insecticide material into said dispensing means; and
   i. said cover member has means thereon for covering and sealing each of said ports in said rim portion of said receptacle.

8. A combination insecticide applicator and feeder for livestock comprising:
   a. a support structure;
   b. an open top receptacle having a side wall and a bottom wall, said receptacle being adapted to support a livestock attracting material therein and having a plurality of circumferentially spaced access apertures in said side wall;
   c. means on said support structure and on said receptacle to support said receptacle with said access apertures in a selected position above a ground surface;
   d. dispensing means having insecticide material therein and supported on said receptacle and surrounding same and spaced from said access apertures in said side wall of said receptacle for dispensing the insecticide material onto livestock in response to engagement thereof by the livestock;
   e. a shield depending from said receptacle and positioned to protect said dispensing means from weather;
   f. a cover member adapted to be retained in covering relation with the open top of said receptacle and said dispensing means for covering and protecting same from weather;
   g. an insert positioned within said receptacle and adapted to retain the livestock attracting material thereabove and to define a plurality of compartments above said bottom wall of said receptacle, said insert being adapted to direct flow of the livestock attracting material from above said insert into the plurality of compartments above said receptacle bottom wall;
   h. said receptacle has an upper rim portion extending outwardly from said side wall thereof and adapted to support said cover member thereon;
   i. said support structure has a base portion and an annular upper portion;
   j. said side wall of said receptacle has inner and outer ledge positions positioned intermediate said upper rim portion and said bottom wall;
   k. said outer ledge portion of said receptacle side wall is adapted to seat on said annular upper portion of said support structure;
   l. said insert has an upper flange portion supported on said inner ledge portion of said receptacle and a body portion depending from said flange portion;
   m. said access apertures in said side wall of said receptacle are each positioned between said ledge portion and said bottom wall of said receptacle and spaced upwardly from said bottom wall;
   n. said shield has a lower edge positioned below said access apertures in said side wall of said receptacle until engaged by livestock;
   o. said dispensing means has a porous and flexible bottom wall member extending between the lower edge of said shield and said ledge portion of said receptacle side wall;
   p. said flexible bottom wall member of said dispensing means is adapted to permit passage of the insecticide material therethrough in response to engagement thereof by livestock; and
   q. means associated with said dispensing means to control air flow through said bottom wall member of said dispensing means and thereby control amount of insecticide material dispensed through said bottom wall member.

9. A combination insecticide applicator and feeder for livestock as set forth in claim 8 wherein:
   a. said dispensing means has a plurality of air openings therein adjacent to and under said cover member to permit flow of air into and out of said dispensing means; and
   b. said means to control air flow through said bottom wall member of said dispensing means includes means for selectively opening and closing said air openings.

* * * * *